United States Patent [19]

Tomek

[11] Patent Number: 4,798,754
[45] Date of Patent: Jan. 17, 1989

[54] OIL-ABSORBENT FLOOR MAT

[76] Inventor: Lawrence S. Tomek, Drake Creekside Two No. 320, 2629 Redwing Rd., Ft. Collins, Colo. 80526

[21] Appl. No.: 85,721

[22] Filed: Aug. 10, 1987

[51] Int. Cl.[4] ............................................. F16N 31/00
[52] U.S. Cl. ................................... 428/74; 184/106; 296/38; 428/81; 428/84; 428/138; 428/157; 428/191; 428/192; 428/284; 428/34.2
[58] Field of Search ................ 428/40, 81, 101, 131, 428/137, 138, 157, 165, 171, 177, 233, 284; 184/106; 296/38, 39 R, 74, 80, 84, 191

[56] References Cited

U.S. PATENT DOCUMENTS

| | | | |
|---|---|---|---|
| 2,986,235 | 5/1961 | Weibert, Jr. | 184/106 |
| 2,996,150 | 8/1961 | Cassem | 184/106 |
| 3,062,323 | 11/1962 | Ogauovic | 184/106 |
| 3,141,522 | 7/1964 | Fitzpatrick | 184/106 |
| 3,195,683 | 7/1965 | Peterson | 184/106 |
| 3,228,491 | 1/1966 | Gatsos | 184/106 |
| 3,282,381 | 11/1966 | Fitzpatrick | 184/106 |
| 3,284,273 | 11/1966 | Prentice | 428/76 |
| 3,333,652 | 8/1967 | Tribuzi | 180/69.1 |
| 3,523,536 | 8/1970 | Ruffo | 128/287 |
| 3,524,787 | 8/1970 | Chavannes | 156/498 |
| 3,526,564 | 9/1970 | Crawford | 428/71 |
| 3,565,214 | 2/1971 | Koonce, Sr. | 184/106 |
| 3,586,565 | 6/1971 | Fielding | 156/210 |
| 3,616,155 | 10/1971 | Chavannes | 428/159 |
| 3,634,227 | 1/1972 | Patterson, Jr. | 210/11 |
| 3,722,626 | 3/1973 | Stack | 184/106 |
| 3,739,913 | 6/1973 | Bogesian | 210/242 |
| 3,815,702 | 6/1974 | Paananeu | 180/69.1 |
| 3,904,528 | 9/1975 | Yocum | 210/242 |
| 4,111,813 | 9/1978 | Press | 210/282 |
| 4,401,475 | 8/1983 | Eriksson | 134/6 |
| 4,484,661 | 11/1984 | Evenson | 184/106 |
| 4,497,147 | 2/1985 | Clapper | 52/105 |
| 4,526,825 | 7/1985 | Whitehead | 428/74 |
| 4,559,250 | 12/1985 | Paige | 428/40 |
| 4,564,546 | 1/1986 | Jones | 428/81 |
| 4,614,679 | 9/1986 | Farrington, Jr. et al. | 428/138 |
| 4,619,553 | 10/1986 | Fischer | 405/63 |
| 4,684,562 | 8/1987 | Hartkemeyer | 428/192 |

FOREIGN PATENT DOCUMENTS

| | | | |
|---|---|---|---|
| 2801636 | 7/1979 | Fed. Rep. of Germany | 428/101 |
| 1340636 | 12/1973 | United Kingdom | 428/40 |

Primary Examiner—William J. Van Balen
Attorney, Agent, or Firm—John E. Reilly

[57] ABSTRACT

A lightweight, disposable absorbent mat is adapted for placement beneath a motor vehicle or machine to catch oil, grease and other drippings and comprises a generally rectangular base layer which is made up of an oil-impervious material, and a plurality of upper, oil-absorbent plies are interconnected to one another and superimposed on the base layer, the plies being made up of a highly absorbent paper or cellulose material. The plies of paper material are interconnected at spaced intervals and may be covered with an upper plastic layer which is perforated to permit any drippings to pass through the upper layer into the absorbent plies, the upper layer having an outer peripheral edge or edges sealed to the outer peripheral edges of the bottom layer to form a moisture barrier around the sides of the absorbent plies; and stiffener frame members may be interposed between the outer peripheral edges of the upper and base layers.

9 Claims, 1 Drawing Sheet

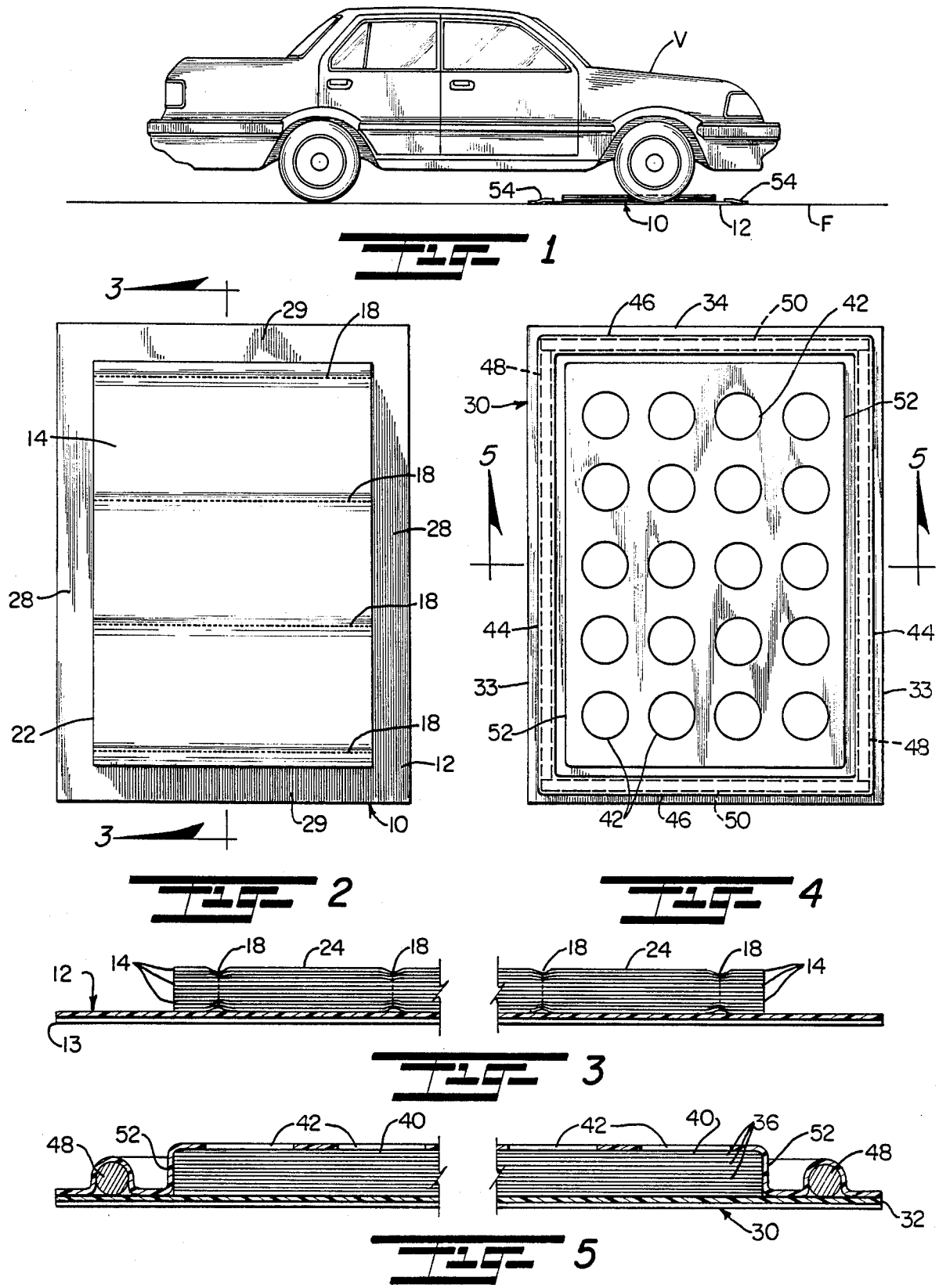

OIL-ABSORBENT FLOOR MAT

SPECIFICATION

This invention relates to oil-absorbent materials; and more particularly relates to a novel and improved oil-absorbent mat specifically adaptable for use in placement on garage or machine shop floors to catch oil drippings from a motor vehicle or machine.

BACKGROUND AND FIELD OF INVENTION

It has been proposed to employ drip-catching mats which are principally designed for use beneath motor vehicles. For example, when a motor vehicle is at rest there is a tendency for it to leak oil, grease or coolant onto the garage floor. In extreme cases, not only can this become very messy but can present a hazard to persons walking across the floor and accidentally slipping on the drippings. Of the floor mats devised in the past, U.S. Pat. No. 4,497,147 to D. D. Clapper et al discloses a mat in which the bottom layer is adapted to be attached to the floor surface and a blotter layer is placed on the bottom layer, the blotter being composed of a cellulosic material which may be in one or more layers to absorb drippings from the automobile.

Representative of other approaches is U.S. Pat. No. 3,062,323 to P. Oganovic shows a mat having an oil absorbent layer composed of pressed wood. In U.S. Pat. No. 3,228,491 to S. L. Gatsos, the layer is composed of an oil or moisture-proof material with an upper layer composed of a fiberboard having perforations and a corrugated layer adapted to absorb oil and other drippings. In U.S. Pat. No. 3,722,626 to L. J. Stack, an oil-absorbent particulate material fills the recessed areas above and below a panel and is covered with a fabric envelope. As a result, the mat can be reversed when one side has become saturated.

In U.S. Pat. No. 3,141,522 to R. P. Fitzpatrick, a clay material is provided for absorption of drippings from an automobile.

Among other problems inherent in the use of oil-absorbent mats is their tendency to shift when placed on a rather slick garage floor, and it has been proposed in the past to the employ various types of tacky or non-stick layers as the base layer for such mats. Representative of such approaches are those illustrated and described in U.S. Pat. No. 3,565,214 to J. W. Koonce, Sr.; No. 2,996,150 to G. R. Cassem; and 2,896,235 to B. E. Weibert, Jr.

Now it is proposed to provide an oil-absorbent mat designed in particular for use in catching oil drippings from a motor vehicle which is lightweight, disposable, economical to manufacture, can be easily assembled, is not subject to wrinkling or shifting when placed on a slick surface, such as, a garage floor, and has excellent absorption properties.

SUMMARY OF THE INVENTION

It is therefore an object of the present invention to provide for a novel and improved floor mat which is disposable and of lightweight, unitary construction but having an excellent capacity for absorption of oil and other drippings from a motor vehicle.

It is another object of the present invention to provide for a novel and improved oil-absorbent mat which has sufficient rigidity as to avoid wrinkling or shifting when placed on a garage floor or machine shop floor but sufficient absorbency to retain drippings from a motor vehicle over extended time intervals without the necessity of replacement.

A further object of the present invention is to provide for a novel and improved absorbent mat having a plurality of layers secured together so as to be of unitary construction and which in use demonstrates unusually high capacity for absorption of oil and like materials, but will resists seepage of the drippings onto the floor.

Another object of the present invention is to provide for a novel and improved mat capable of absorbing large quantities of drippings from motor vehicles, machines and the like and having an impervious barrier layer forming the base of the mat so as to prevent seepage of the oil or other drippings onto the floor surface.

In accordance with the present invention, there has been devised an oil-absorbent floor mat which is specifically adapted for use in catching oil and other drippings from a motor vehicle. In one form of invention, the mat is made up of a generally rectangular base layer which is composed of an oil-impervious material, and a plurality of thin, flexible plies of oil-absorbent paper material are superimposed on the base layer with means for securing the plies together at spaced intervals to one another, and additional securing means for securing the lowermost of the plies to the upper surface of the base layer to form a unitary structure.

In an alternate form of invention, an upper plastic layer covers the oil absorbent plies and is perforated to permit oil drippings to pass through the upper layer into the oil absorbent plies, the upper layer having outer peripheral edges which are sealed to outer peripheral edges of the base layer in surrounding relation to the plies, and stiffener rods are interposed between the outer peripheral edges of the upper layer and base layer to effectively rigidify the entire structure.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a side view illustrating disposition of a preferred form of the invention so a garage floor surface beneath an automobile;

FIG. 2 is a top plan view of a preferred form of oil-absorbent mat in accordance with the present invention;

FIG. 3 is a cross-sectional view taken about lines 3—3 of FIG. 2;

FIG. 4 is a top plan view of a modified form of mat in accordance with the present invention; and FIG. 5 is a cross-sectional view taken about lines 5—5 of FIG. 4.

DETAILED DESCRIPTION OF THE PREFERRED EMBODIMENT

Referring in more detail to the drawings, there is illustrated in FIGS. 1 to 3 one form of absorbent mat 10. As shown in FIG. 1, the mat is intended to be placed on a floor surface F beneath the front end or engine or a motor vehicle V so as to catch any oil or other liquid drippings from the motor vehicle V. Typically, the mat may be on the order of 2.5' by 4.5' but can be virtually of any desired size which will substantially traverse the width between the wheel base of the car and the length of the engine. Preferably, the absorbent mat 10 is comprised of an impervious base layer 12 which is somewhat corrugated or ruffled in construction as designated at 13. A preferred composition of material is a closed cell foam material on the order of 1/16" thick, such as, that sold under the trademark "Cushion Foam" by Richter Manufacturing Company of Pomona, Calif.

Multiple layers or plies 14 of a liquid or oil-absorbent material are stacked on the base layer 12. Preferably, the plies 14 are composed of a cellulose wadding material, each ply being approximately 1/32" thick. In the form shown, there may be on the order of 5 to 10 plies 14, and seams 18 are formed by embossing the plies 14 together at spaced intervals so as to interlock the layers to one another and prevent accidental shifting or misplacement. In addition, an adhesive, not shown, is applied between the lowermost of plies 14 and the base 12 so as to securely unite the plies 14 to the base layer. The adhesive may be applied at spaced intervals between the lowermost layer 14 and base 12 or applied uniformly around the peripheral edges 22 of the lowermost layer 14 so as to securely affix the layers to the base 12.

A top layer 24 of the absorbent layers 14 is of smoother texture than the layers 14 but of an absorbent material corresponding to that of the layers 14 and secured to the layers 14 by the seams 18 as described. In assembled form, the base layer 12 has outer peripheral side edges 28 and end edges 30 which extend beyond the side and end edges of the layers 14 for a limited distance on the order of ¼" to 1".

There is illustrated in the modified form of FIGS. 4 and 5 a mat 30 having a base layer 32 with outer surrounding side edges 33 and end edges 34. Cellulose material, such as, oil-absorbent paper or plies 36 corresponding to the plies 14 of FIGS. 1 to 3 are secured together in the manner described and in multiple plies which are firmly adhered by securing the lowermost of the plies 36 to the base layer 32. Seams 38 are formed at spaced intervals through the thickness of the plies 36 to loosely unite the plies and avoid accidental misplacement or shifting.

In the modified form, a top layer 40 serves to encapsulate the plies 36 between the top layer 40 and base layer 32 while permitting any oil or other drippings to pass through the top layer and be effectively absorbed by the plies 36. To this end, the top layer 40 may be composed of a plastic material which is impervious to oil or other moisture but in which a plurality of closely-spaced openings or perforations 42 are formed so as to permit any oil or other drippings to pass through the top layer for absorption by the intermediate plies 36. The top layer 40 has outer surrounding side edges 44 and end edges 46 which are aligned with the side edges 33 and end edges 34 of the base layer 32. Stiffener side rods 48 and end rods 50 are placed or inserted between the outer side and end edges, respectively, of the top layer 40 and base layer 32 so that when the edges are sealed together in surrounding relation to the rods, a relatively stiff or rigid frame is provided for the mat. In addition, the perforation or openings 42 are limited to the top surface of the layer 40 so that the sides of the layer 40 as designated at 52 will effectively form a moisture barrier to retain excess fluids which may seep out of the absorbent layers 36.

As further illustrated in FIG. 1, an adhesive tape 54 may be applied around the edges 33 and 34 of the base layer 12 to secure the edges firmly to the floor surface and to prevent shifting or movement of the mat. It will be readily apparent that the mat 10 may be placed in other suitable frames or holders if desired. Nevertheless, it has been found that the slight corrugations formed in the base layer are sufficient under normal usage to avoid any shifting or wrinkling of the material or mat. A typical size of a mat or pad is on the order of 2.5' by 4.5', and any suitable type of reinforcement in addition to the stiffener rods may be employed if desired, depending upon the application of the mat. Suitably, the top layer as well as the individual plies 14 and base layer 12 of either form of invention may be suitably sprayed or otherwise treated with a flame-retardant material so as to minimize the possibility of fire.

An important advantage of the mat 10 as described is its ability to be packed in tightly compressed form so that several mats can be packaged in a single box. The mats may be formed in sections or elongated strips which can be divided into individual mats of the desired length; and once saturated the mat can be discarded and replaced with another mat section. As noted earlier, the base layer 12 typically has a thickness on the order of 1/16" and each individual ply of paper has a thickness on the order of 1/32" and collectively may have a thickness, depending on the number of plies, on the order of ¼" to ½". Notwithstanding the ability to compress the mat into extremely compact form, when laid out on a floor surface the individual plies 14 of the mat 10 will tend to expand or separate from one another. In expanded or separated form, the plies 14 are very effective in absorbing large quantities of oil or like materials. Moreover, the outer side and end edges of the base layer which border the plies 14 will discourage seepage of the drippings away from the plies.

It is therefore to be understood that various modifications and changes may be made in the specific construction and arrangement of parts as well as composition of materials comprising the alternate forms of the present invention without departing from the spirit and scope thereof as defined by the appended claims.

I claim:

1. An absorbent floor mat for absorbing oil and grease drippings beneath a motor vehicle comprising:
    a generally rectangular base layer composed of a thin, flexible, oil-impervious material; and
    a plurality of upper oil-absorbent flexible plies superimposed on said base layer including means for securing said plies to one another, said absorbent plies being composed of a cellulose wadding material, and means for securing a lowermost of said plies to an upper surface of said base layer, said absorbent plies being of generally rectangular configuration and having an area no greater than said base layer, said means for securing said absorbent layers to said base layer operative to secure said absorbent layers in centered relation to said base layer.

2. An absorbent floor mat according to claim 1, said base layer being composed of a closed cell foam material having corrugations therein.

3. An absorbent floor mat according to claim 1, said absorbent plies each composed of a cellulose material, and said means for securing said absorbent plies together defined by embossing at spaced intervals across said absorbent plies.

4. An absorbent floor mat according to claim 1, said base layer being of a generally rectangular configuration and of a size greater than said absorbent plies.

5. An absorbent floor mat according to claim 1, an upper layer disposed over said absorbent plies and having outer peripheral edges in sealed relation to outer peripheral edges of said base layer, said upper layer provided with openings at spaced intervals therein, and hold-down means for securing said mat to a surface beneath the motor vehicle.

6. An absorbent floor mat according to claim 5, including rigid frame members disposed between said outer peripheral edges of said upper layer and said base layer in surrounding relation to said absorbent plies.

7. An absorbent floor mat for absorbing oil and grease drippings beneath a motor vehicle comprising:
   a base layer composed of a thin, flexible, oil-impervious material;
   a thick, upper oil-absorbent cellulose material disposed on said base layer; and
   an upper layer disposed over said material and having outer peripheral edges in sealed relation to outer peripheral edges of said base layer, said upper layer provided with openings at spaced intervals therein, and rigid frame members disposed between said outer peripheral edges of said upper layer and said base layer in surrounding relation to said absorbent plies, said base layer being of a generally rectangular configuration and of a size greater than said absorbent plies.

8. An absorbent floor mat according to claim 7, said absorbent layers composed of a paper or paper-like material, said base layer composed of a foam material, and said means for securing said absorbent plies together defined by seams embossed at spaced intervals across said absorbent plies.

9. An absorbent floor mat according to claim 7, said cellulose material defined by a plurality of oil-absorbent plies superimposed on said base layer including means for securing said plies to one another, means for securing the lowermost of said plies to an upper surface of said base layer, said plies having an area no greater than said base layer, and said frame members defined by stiffener rods in outer spaced surrounding relation to said oil-absorbent plies.

* * * * *